United States Patent
Lee

(10) Patent No.: US 9,466,193 B2
(45) Date of Patent: Oct. 11, 2016

(54) DEVICE AND METHOD FOR DETECTING INTRUSION

(71) Applicant: Hyundai Motor Company, Seocho-gu, Seoul (KR)

(72) Inventor: Jung Jun Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 18 days.

(21) Appl. No.: 14/324,885

(22) Filed: Jul. 7, 2014

(65) Prior Publication Data

US 2015/0166011 A1    Jun. 18, 2015

(30) Foreign Application Priority Data

Dec. 18, 2013    (KR) .................. 10-2013-0158716

(51) Int. Cl.
| | |
|---|---|
| *B60R 25/10* | (2013.01) |
| *G08B 13/181* | (2006.01) |
| *G01S 15/04* | (2006.01) |
| *G01S 7/52* | (2006.01) |
| *G08B 13/16* | (2006.01) |

(52) U.S. Cl.
CPC ......... *G08B 13/181* (2013.01); *B60R 25/1009* (2013.01); *G01S 7/52004* (2013.01); *G01S 15/04* (2013.01); *G08B 13/1618* (2013.01)

(58) Field of Classification Search
None
See application file for complete search history.

(56) References Cited

U.S. PATENT DOCUMENTS

| | | | | |
|---|---|---|---|---|
| 4,639,902 A | * | 1/1987 | Leverance | G08B 13/1636 340/552 |
| 4,727,522 A | * | 2/1988 | Steiner | G08B 29/14 340/515 |
| 4,729,120 A | * | 3/1988 | Steiner | G08B 29/14 340/515 |
| 5,808,544 A | * | 9/1998 | Kani | B60R 25/1009 340/426.26 |
| 5,856,778 A | * | 1/1999 | Kani | B60R 25/1009 307/10.2 |
| 2002/0113696 A1 | * | 8/2002 | Nilsson | B60R 25/1009 340/541 |
| 2007/0001115 A1 | * | 1/2007 | Iwasawa | G08B 13/183 250/338.1 |
| 2010/0026487 A1 | * | 2/2010 | Hershkovitz | G08B 29/18 340/541 |
| 2012/0087211 A1 | * | 4/2012 | Lee | G08B 13/1609 367/93 |
| 2013/0077442 A1 | * | 3/2013 | Hersey | G01S 7/536 367/99 |
| 2014/0232536 A1 | * | 8/2014 | Uda | G01S 15/523 340/426.24 |
| 2015/0166010 A1 | * | 6/2015 | Kyung | B60R 25/10 340/426.24 |
| 2015/0175126 A1 | * | 6/2015 | Chun | B60R 25/1009 340/426.24 |

FOREIGN PATENT DOCUMENTS

| | | | |
|---|---|---|---|
| JP | 06052449 A | * | 2/1994 |
| JP | 2001253319 A | * | 9/2001 |
| JP | 2011-106879 A | | 6/2011 |
| JP | 2012-220253 A | | 11/2012 |
| KR | 10-1180797 B | | 9/2012 |

\* cited by examiner

*Primary Examiner* — Julie Lieu
(74) *Attorney, Agent, or Firm* — McDermott Will & Emery LLP

(57) ABSTRACT

An intrusion detecting device includes a transmitter configured to transmit ultrasonic waves, a receiver configured to receive ultrasonic waves, and a controller configured to control the transmitter to output ultrasonic waves with a reference period, and configured to control a transmission period of the transmitter such that a voltage level of received ultrasonic waves may become equal to a reference voltage level. The controller is configured to determine an intrusion based on the voltage level of the received ultrasonic waves and a frequency of the received ultrasonic waves.

8 Claims, 2 Drawing Sheets

DEVICE AND METHOD FOR DETECTING INTRUSION

CROSS-REFERENCE TO RELATED APPLICATION

This application claims benefit of priority to and the benefit of Korean Patent Application No. 10-2013-0158716 filed in the Korean Intellectual Property Office on Dec. 18, 2013, the entire contents of which are incorporated herein by reference.

TECHNICAL FIELD

The present disclosure relates to a device and method for detecting an intrusion. More particularly, the present disclosure relates to a device and method for detecting an intrusion into a vehicle.

BACKGROUND

Thieves frequently break into vehicles parked in a parking lot, and steal navigation modules, audio sets, drivers' wallet and cameras, and so on, which is becoming a social issue.

In order to prevent a thief from intruding into a vehicle, the vehicle may be provided with an intrusion detecting device, but an intrusion detecting device of the related art excessively sensitively operates according to an error of an installed sensor, whether a window of the vehicle is opened, and the type of things (e.g., leather seat, vinyl cover) in the vehicle, thereby deteriorating detection performance.

The above information disclosed in this Background section is only for enhancement of understanding of the background of the inventive concept and therefore it may contain information that does not form the prior art that is already known in this country to a person of ordinary skill in the art.

SUMMARY

The present disclosure has been made in an effort to provide a device and method for detecting intrusion having advantages of maintaining performance to consistently detect intrusion regardless of an interior and exterior situation of a vehicle.

Aspects of the present disclosure are not limited to the aforementioned concept, and other concepts not mentioned above will be apparently understood by a person of ordinary skill in the art to which the present disclosure belongs, from the following description.

An aspect of the present disclosure relates to a device for detecting intrusion, including a transmitter configured to transmit ultrasonic waves, a receiver configured to receive ultrasonic waves, and a controller configured to control the transmitter to output ultrasonic waves with a reference period, and configured to control a transmission period of the transmitter such that a voltage level of received ultrasonic waves may become equal to a reference voltage level. The controller is configured to determine an intrusion based on the voltage level of the received ultrasonic waves and a frequency of the received ultrasonic waves.

When the voltage level of the received ultrasonic waves is equal to the reference voltage level, the controller may be configured to maintain the transmission period of the transmitter; when the voltage level of the received ultrasonic waves is higher than the reference voltage level, the controller may be configured to increase the transmission period of the transmitter; and when the voltage level of the received ultrasonic waves is lower than the reference voltage level, the controller may be configured to decrease the transmission period of the transmitter.

When the voltage level of the received ultrasonic waves is equal to or higher than a predetermined intrusion voltage level, the controller may be configured to determine that an intrusion occurs and generate an intrusion alarm.

When the frequency of the received ultrasonic waves is equal to or larger than a predetermined intrusion frequency, the controller may determine that an intrusion occurs and generate an intrusion alarm.

The controller may include a mode selector, and when an intrusion detecting mode is selected by the mode selector, the control may be configured to determine the intrusion.

Another aspect of the present disclosure encompasses a method of detecting intrusion through a device that includes a transmitter for transmitting ultrasonic waves, a receiver for receiving ultrasonic waves, and a controller for controlling a transmission period of the transmitter. According to the method, the transmitter is controlled to output ultrasonic waves with a reference period. A transmission period of the transmitter is controlled so that a voltage level of ultrasonic waves received by the receiver becomes equal to a reference voltage level. An intrusion is determined based on the voltage level of the received ultrasonic waves and a frequency of the received ultrasonic waves.

The controlling of the transmission period of the transmitter may include comparing the voltage level of the received ultrasonic waves with the reference voltage level and determining whether the voltage level of the received ultrasonic waves is equal to the reference voltage level. The transmission period of the transmitter may be maintained when it is determined the voltage level of the received ultrasonic waves is equal to the reference voltage level. The transmission period of the transmitter may be decreased when it is determined that the voltage level of the received ultrasonic waves is lower than the reference voltage level. The transmission period of the transmitter may be increased when it is determined that the voltage level of the received ultrasonic waves is higher than the reference voltage level.

The determining of the intrusion may include comparing the voltage level of the received ultrasonic waves with a predetermined intrusion voltage level and determining whether the voltage level of the received ultrasonic waves is equal to or higher than the intrusion voltage level. When it is determined that the voltage level of the received ultrasonic waves is equal to or higher than the intrusion voltage level, it may be determined that an intrusion occurs.

The determining of the intrusion may include comparing a frequency of the received ultrasonic waves with a predetermined intrusion frequency and determining whether the frequency of the received ultrasonic waves is equal to or larger than the intrusion frequency. When it is determined the frequency of the received ultrasonic waves is equal to or larger than the intrusion frequency, it may be determined that an intrusion occurs.

The method may further include selecting a mode, and when the mode is selected, determining the intrusion.

According to an embodiment of the present disclosure, it is possible to maintain performance to consistently detecting intrusion regardless of an interior and exterior situation of a vehicle

DETAILED DESCRIPTION

Figure 1:
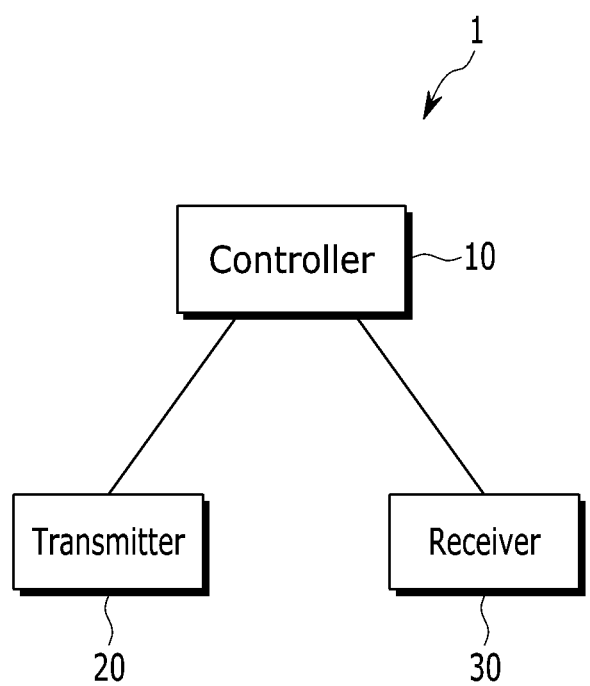
FIG. 1 shows a schematic diagram of an intrusion detecting device according to an exemplary embodiment of the present disclosure.

The present disclosure will be described more fully hereinafter with reference to the accompanying drawings, in which exemplary embodiments of the inventive concept are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

Unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

FIG. 1 shows a schematic diagram of an intrusion detecting device according to an exemplary embodiment of the present disclosure.

Hereinafter, referring to FIG. 1, an intrusion detecting device 1 according to an exemplary embodiment of the present disclosure will be described.

The intrusion detecting device 1, in an intrusion detecting mode, may output ultrasonic waves with a constant period in a vehicle, receives reflected ultrasonic waves to detect intrusion into the vehicle, and generate an intrusion alarm when an intrusion occurs into the vehicle.

For example, the intrusion detecting mode may be a mode that outputs ultrasonic waves in a vehicle to detect an intrusion into the vehicle when intrusion-related information (e.g., association rule mining (ARM) information) is received by a body control module (BCM).

The intrusion detecting device 1 may include a controller 10, a transmitter 20, and a receiver 30.

When the intrusion detecting mode is selected by a mode selector (not shown), the controller 10 may control the transmitter 20 to output ultrasonic waves with a predetermined reference period in the vehicle. The transmitter 20 may be provided in the vehicle. The controller 10 may determine whether an intrusion occurs and generate an intrusion alarm based on a voltage level and frequency of ultrasonic waves that are reflected by an object in the vehicle and received by the receiver 30.

More specifically, when the voltage level of the received ultrasonic waves is equal to or higher than a predetermined intrusion voltage level, the controller 10 may determine that an intrusion occurs. When the frequency of the received ultrasonic waves is equal to or higher than a predetermined intrusion frequency, the controller 10 may determine that an intrusion occurs and generate an intrusion alarm.

In addition, the controller 10 may compare the voltage level of the received ultrasonic waves with a reference voltage level, and control an ultrasonic wave transmission period of the transmitter 20 so that the voltage level of the received ultrasonic waves may become equal to the reference voltage level.

More specifically, when the voltage level of the received ultrasonic waves is equal to the reference voltage level, the controller 10 may maintain the ultrasonic wave transmission period of the transmitter 20.

The controller 10 may increase the ultrasonic wave transmission period when the voltage level of the received ultrasonic waves is higher than the reference voltage level. For example, when a window of the vehicle is open, or an object exists in the vehicle, the voltage level of the received ultrasonic waves is higher, thereby causing a faulty detection, so a malfunction may occur.

In this case, the controller 10 may increase the ultrasonic wave transmission period so that the voltage level of the received ultrasonic waves may be equal to the reference voltage level.

The controller 10 may decrease the ultrasonic wave transmission period when the voltage level of the received ultrasonic waves is lower than the reference voltage level. For example, when a sensor (not shown) of the receiver 30 deteriorates, since the voltage level of the received ultrasonic waves is lower, detection of an intrusion may not be normally performed even if an intrusion into the vehicle occurs. In this case, the controller 10 may decrease the ultrasonic wave transmission period so that the voltage level of the received ultrasonic waves may be equal to the reference voltage level.

When the intrusion detecting mode is selected, the transmitter 20 may transmit the ultrasonic waves with the predetermined reference period in the vehicle according to control of the controller 10.

The transmitter 20 may transmit ultrasonic waves with the controlled period so that the voltage level of the received ultrasonic waves may be equal to the reference voltage level. That is, the ultrasonic waves with the controlled period may be identical to the ultrasonic waves with the predetermined reference period.

The receiver 30 may receive ultrasonic waves reflected in the vehicle. The receiver 30 may include a sensor (not shown), and the sensor may be configured to detect and measure the voltage level and frequency of the received ultrasonic waves.

Figure 2:
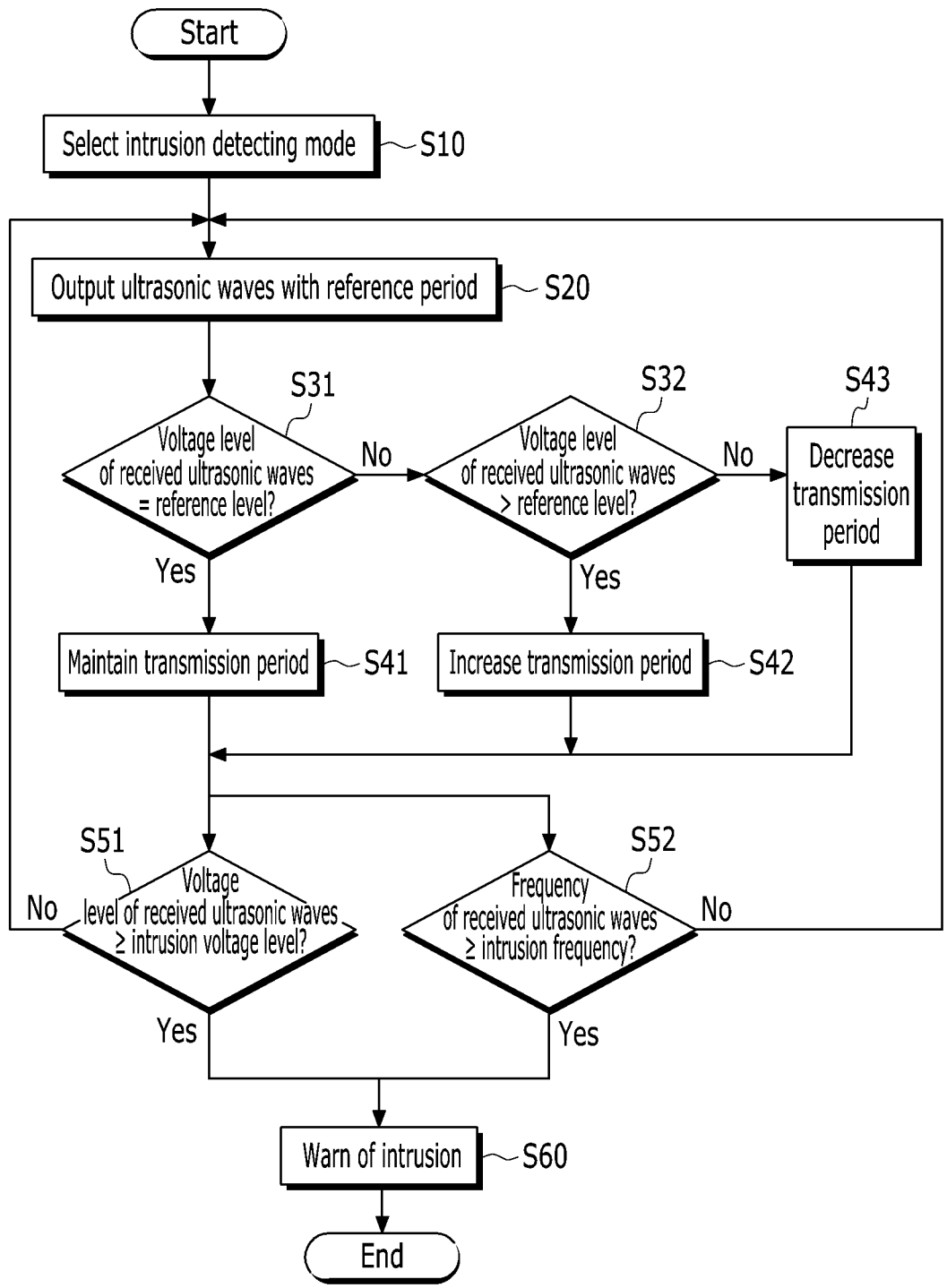
FIG. 2 shows a flowchart of an intrusion detecting method according to an exemplary embodiment of the present disclosure.

FIG. 2 shows a flowchart of an intrusion detecting method according to an exemplary embodiment of the present disclosure.

Hereinafter, referring to FIG. 2, an intrusion detecting method according to an exemplary embodiment of the present disclosure will be described.

When an intrusion detecting mode is selected at step S10, the controller 10 may control the transmitter 20 to output ultrasonic waves with a predetermined reference period in the vehicle at step S20.

The controller 10 may compare the voltage level of the received ultrasonic waves with the reference voltage level and determine whether the voltage level of the received ultrasonic waves is equal to the reference voltage level at step S31, and when it is determined that the voltage level of the received ultrasonic waves is equal to the reference voltage level, e.g., based on a result of the comparison, the controller 10 may maintain the transmission period of the transmitter 20 at step S41.

When it is determined at step S32 that the voltage level of the received ultrasonic waves is not equal to the reference voltage level, and the voltage level of the received ultrasonic waves is higher than the reference voltage level, the controller 10 may increase the transmission period so that the voltage level of the received ultrasonic waves may be equal to the reference voltage level at step S42.

When it is determined that the voltage level of the received ultrasonic waves is lower than the reference voltage level, the controller 10 may decrease the transmission period so that the voltage level of the received ultrasonic waves may be equal to the reference voltage level at step S43.

The controller 10 may compare the voltage level of the received ultrasonic waves with the intrusion voltage level at step S51 and determine whether the voltage level of the received ultrasonic waves is equal to or higher than the intrusion voltage level. When it is determined that the voltage level of the received ultrasonic waves is equal to or higher than the intrusion voltage level, the controller 10 may determine that an intrusion occurs and generate an intrusion alarm at step S60.

The controller 10 may compare the frequency of the received ultrasonic waves with the intrusion frequency at step S52 and determine whether the frequency of the received ultrasonic waves is equal to or larger than the intrusion frequency. When it is determined that the frequency of the received ultrasonic waves is equal to or larger than the intrusion frequency, the controller 10 may determine that an intrusion occurs and generate an intrusion alarm at step S60.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A device for detecting intrusion, comprising:
    a transmitter configured to transmit ultrasonic waves;
    a receiver configured to receive ultrasonic waves; and
    a controller configured to control the transmitter to output ultrasonic waves with a reference period, and configured to determine a transmission period of the transmitter by comparing a voltage level of received ultrasonic waves with a reference voltage level,
    wherein the controller is configured to determine an intrusion based on the voltage level of the received ultrasonic waves and a frequency of the received ultrasonic waves,
    wherein when the voltage level of the received ultrasonic waves is equal to the reference voltage level, the controller is configured to maintain the transmission period of the transmitter,
    wherein when the voltage level of the received ultrasonic waves is higher than the reference voltage level, the controller is configured to increase the transmission period of the transmitter, and
    wherein when the voltage level of the received ultrasonic waves is lower than the reference voltage level, the controller is configured to decrease the transmission period of the transmitter.

2. The device of claim 1, wherein when the voltage level of the received ultrasonic waves is equal to or higher than a predetermined intrusion voltage level, the controller is configured to determine that an intrusion occurs and generate an intrusion alarm.

3. The device of claim 1, wherein when the frequency of the received ultrasonic waves is equal to or larger than a predetermined intrusion frequency, the controller is configured to determine that an intrusion occurs and generate an intrusion alarm.

4. The device of claim 1, wherein:
    the controller includes a mode selector, and
    when an intrusion detecting mode is selected by the mode selector, the controller is configured to determine the intrusion.

5. A method of detecting intrusion through a device that comprises a transmitter for transmitting ultrasonic waves, a receiver for receiving ultrasonic waves, and a controller for controlling a transmission period of the transmitter, comprising:
    controlling the transmitter to output ultrasonic waves with a reference period;
    determining a transmission period of the transmitter by comparing a voltage level of ultrasonic waves received by the receiver with a reference voltage level; and
    determining an intrusion based on the voltage level of the received ultrasonic waves and a frequency of the received ultrasonic waves,
    wherein the step of controlling of the transmission period of the transmitter comprises:
    comparing the voltage level of the received ultrasonic waves with the reference voltage level and determining whether the voltage level of the received ultrasonic waves is equal to the reference voltage level,
    maintaining the transmission period of the transmitter when it is determined that the voltage level of the received ultrasonic waves is equal to the reference voltage level,
    decreasing the transmission period of the transmitter when it is determined that the voltage level of the received ultrasonic waves is lower than the reference voltage level, and
    increasing the transmission period of the transmitter when it is determined that the voltage level of the received ultrasonic waves is higher than the reference voltage level.

6. The method of claim 5, wherein the determining of the intrusion comprises:
    comparing the voltage level of the received ultrasonic waves with a predetermined intrusion voltage level and determining whether the voltage level of the received ultrasonic waves is equal to or higher than the predetermined intrusion voltage; and
    when it is determined that the voltage level of the received ultrasonic waves is equal to or higher than the intrusion voltage level, determining that an intrusion occurs.

7. The method of claim 5, wherein the determining of the intrusion comprises:
    comparing a frequency of the received ultrasonic waves with a predetermined intrusion frequency and determining whether the frequency of the received ultrasonic waves is equal to or larger than the intrusion frequency; and
    when it is determined that the frequency of the received ultrasonic waves is equal to or larger than the intrusion frequency, determining that an intrusion occurs.

8. The method of claim 5, further comprising:
    selecting a mode; and
    when the mode is selected, determining the intrusion.

* * * * *